United States Patent
Shirota et al.

(10) Patent No.: US 12,459,283 B2
(45) Date of Patent: Nov. 4, 2025

(54) PRINTED PRODUCT AND METHOD OF PRODUCING PRINTED PRODUCT

(71) Applicant: CANON KABUSHIKI KAISHA, Tokyo (JP)

(72) Inventors: Koromo Shirota, Kanagawa (JP); Masataka Yashima, Tokyo (JP); Taichi Shintou, Saitama (JP); Tsuyoshi Santo, Kanagawa (JP); Tomoyuki Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 18/053,720

(22) Filed: Nov. 8, 2022

(65) Prior Publication Data

US 2023/0151231 A1    May 18, 2023

(30) Foreign Application Priority Data

Nov. 12, 2021 (JP) ................................. 2021-185268
Sep. 16, 2022 (JP) ................................. 2022-148151

(51) Int. Cl.
*B41M 5/388* (2006.01)
*B41M 5/382* (2006.01)
*B41M 7/00* (2006.01)

(52) U.S. Cl.
CPC ........ *B41M 5/388* (2013.01); *B41M 5/38264* (2013.01); *B41M 5/382* (2013.01); *B41M 7/0027* (2013.01); *B41M 2205/02* (2013.01); *B41M 2205/28* (2013.01)

(58) Field of Classification Search
CPC .. B41M 5/382; B41M 5/38264; B41M 5/388; B41M 7/0027; B41M 2205/02; B41M 2205/28
See application file for complete search history.

(56) References Cited

U.S. PATENT DOCUMENTS

2015/0367665 A1* 12/2015 Nakano ................... B41J 17/00
    428/32.75
2021/0060995 A1*  3/2021 Hayakawa .......... C09B 67/0034

FOREIGN PATENT DOCUMENTS

| JP | H07257053 A | 10/1995 | | |
| JP | 2004300224 A | 10/2004 | | |
| JP | 2012076322 A | 4/2012 | | |
| JP | 2021006403 A | 1/2021 | | |
| JP | 2021037757 A | * 3/2021 | ............ | B41M 5/345 |
| JP | 2021037767 A | 3/2021 | | |

* cited by examiner

*Primary Examiner* — Gerard Higgins
(74) *Attorney, Agent, or Firm* — Canon U.S.A., Inc. IP Division

(57) ABSTRACT

A printed product including: a yellow image formed on an image receiving sheet including a coloring material receiving layer and a surface protective layer formed on the yellow image, wherein the yellow image and the surface protective layer are formed by sequentially applying heat to a yellow coloring material layer for forming the yellow image and a surface protective layer forming layer for forming a surface protective layer through use of a thermal transfer recording sheet including the yellow coloring material layer and the surface protective layer forming layer field sequentially; the yellow coloring material layer contains a compound having a predetermined structure as a yellow coloring material, and wherein in the printed product having formed thereon the yellow image and the surface protective layer, the compound permeates into the coloring material receiving layer to a depth of 2 μm or more.

2 Claims, No Drawings

PRINTED PRODUCT AND METHOD OF PRODUCING PRINTED PRODUCT

BACKGROUND OF THE INVENTION

Field of the Invention

The present disclosure relates to a printed product and a method of producing a printed product.

Description of the Related Art

In recent years, along with the spread of a portable color display device having high definition and high image quality, such as 4K and 8K, there has been a growing demand for easy color printing of a photograph or a document photographed or produced with the device. A color print system that corresponds to such demand is, for example, an electrophotographic system, an inkjet system, or a thermal transfer recording system. Of those, the thermal transfer recording system is excellent as a method by which the photograph or the document can be easily printed irrespective of its surrounding environment because the system enables the printing by a dry process, and is of a small size and hence excellent in portability of a printer.

In addition, out of the thermal transfer recording systems, a sublimation-type thermal transfer recording system is excellent in formation of a gray-scale image because the system can control the migration of a dye in a dot unit. Accordingly, the system has been frequently used in the printing of landscapes and persons. A coloring material to be used in the system is required to have a high chroma and to be caused to migrate by heat. In addition, in consideration of a production process for a thermal transfer recording sheet, the coloring material is also required to dissolve in a solvent such as toluene. The use of, for example, a pyridone azo dye as such coloring material has been investigated (Japanese Patent Application Laid-Open No. H07-257053 and Japanese Patent Application Laid-Open No. 2012-76322).

The pyridone azo dye described in each of the above-mentioned literatures has had the following property: when the dye is caused to migrate from a coloring material layer to the receiving layer of an image receiving sheet by heat in the sublimation-type thermal transfer system, the dye permeates into the receiving layer only to a slight extent, and hence remains near its surface. Accordingly, there has been a disadvantage in that when the dye serving as a coloring material is exposed to light, the light directly acts on the coloring material, and hence the decomposition of the coloring material advances. In view of the foregoing, the development of a printed product that can suppress the decomposition of the pyridone azo dye has been desired.

SUMMARY OF THE INVENTION

There is provided a printed product including: a yellow image formed on an image receiving sheet including a coloring material receiving layer and a surface protective layer formed on the yellow image, wherein the yellow image and the surface protective layer are formed by sequentially applying heat to a yellow coloring material layer for forming the yellow image and a surface protective layer forming region for forming a surface protective layer through use of a thermal transfer recording sheet including the yellow coloring material layer and the surface protective layer forming region field sequentially; the yellow coloring material layer contains a compound represented by the following general formula (1) as a yellow coloring material, and wherein in the printed product having formed thereon the yellow image and the surface protective layer, the compound represented by the general formula (1) permeates into the coloring material receiving layer to a depth of 2 μm or more:

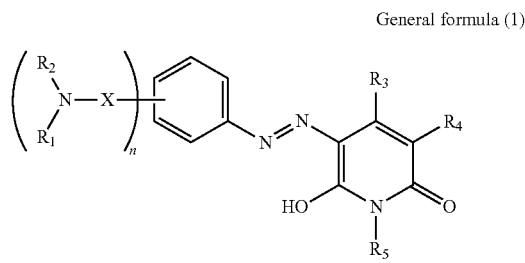

General formula (1)

in the general formula (1), $R_1$ and $R_2$ each independently represent a hydrogen atom, or a linear, branched, or cyclic alkyl group having 1 to 20 carbon atoms, $R_3$ represents a linear or branched alkyl group having 1 to 4 carbon atoms, a phenyl group, or an unsubstituted amino group, $R_4$ represents a hydrogen atom, a cyano group, an unsubstituted carbamoyl group (—C(=O)NH$_2$), a carboxylic acid ester group, or a carboxylic acid amide group, $R_5$ represents a hydrogen atom, a linear, branched, or cyclic alkyl group having 1 to 20 carbon atoms, or —N(—R$_6$)R$_7$, $R_6$ and $R_7$ each represent a linear or branched alkyl group having 1 to 8 carbon atoms, an unsubstituted aryl group, an aryl group having a substituent, an unsubstituted acyl group, or an acyl group having a substituent, or represent —N(—R$_6$)R$_7$, and $R_6$ and $R_7$ satisfy the following specification (i) or (ii): (i) $R_6$ and $R_7$ each independently represent a hydrogen atom, a linear or branched alkyl group having 1 to 8 carbon atoms, an aryl group, or an acyl group; and (ii) $R_6$ and $R_7$ are bonded to each other to form a ring, and $R_6$ and $R_7$ each represent an atomic group required for forming the ring, and X represents a carbonyl group or a sulfonyl group, and "n" represents an integer of from 1 to 3.

Further features of the present disclosure will become apparent from the following description of exemplary embodiments.

DESCRIPTION OF THE EMBODIMENTS

The present disclosure is described in detail below.

The inventors of the present disclosure have made extensive investigations with a view to solving the above-mentioned disadvantage, and as a result, have found that a printed product having a high density and high light fastness is obtained by the following thermal transfer recording sheet and printing process.

A printed product having a high density and high light fastness of the present disclosure is a printed product including at least: a yellow image formed on an image receiving sheet including a coloring material receiving layer and a surface protective layer formed on the yellow image, wherein the yellow image and the surface protective layer are formed by sequentially applying heat to a yellow coloring material layer and a surface protective layer forming region through use of a thermal transfer recording sheet;
  the yellow coloring material layer contains a compound represented by the general formula (1) as a yellow coloring material, and
  wherein in the printed product having formed thereon the yellow image and the surface protective layer, the compound represented by the general formula (1) permeates into the coloring material receiving layer to a depth of 2 µm or more.

The thermal transfer recording sheet includes the yellow coloring material layer and the surface protective layer forming region for forming the surface protective layer field sequentially.

The thermal transfer recording sheet includes the yellow coloring material layer for forming the yellow image and the surface protective layer forming region for forming the surface protective layer field sequentially.

A method of forming an image of the printed product having a high density and high light fastness of the present disclosure is described in more detail below.

In general, a thermal transfer recording sheet is used by being superimposed on a transfer target material such as an image receiving sheet including a coloring material receiving layer on its surface. The thermal transfer recording sheet includes a yellow coloring material layer for forming a yellow image, a cyan coloring material layer for forming a cyan image, a magenta coloring material layer for forming a magenta image, and a surface protective layer forming layer for forming a surface protective layer field sequentially. In addition, image formation is performed as follows: the respective coloring material layers of the thermal transfer recording sheet are heated through use of a heating method such as a thermal head to transfer coloring materials in the thermal transfer recording sheet onto the image receiving sheet. Further, the surface protective layer forming layer of the thermal transfer recording sheet is superimposed on an image formed on the image receiving sheet, and is heated through use of a heating method such as a thermal head to transfer (form) a surface protective layer onto the image.

Although a method of causing the compound represented by the general formula (1) to permeate into the coloring material receiving layer to a depth of 2 µm or more is not particularly limited, examples thereof include a method including heating the printed product before the formation of the surface protective layer, and a method including adjusting the printing heat quantity of the surface protective layer.

Although the method including heating the printed product before the formation of the surface protective layer is not particularly limited, the depth to which the compound represented by the general formula (1) permeates becomes larger or smaller depending on the composition of a resin for forming the coloring material receiving layer. For example, when the surface protective layer is transferred after heating has been performed at 70° C. or more for 1 minute or more, a printed product in which the compound represented by the general formula (1) according to the present disclosure permeates into the coloring material receiving layer to a depth of 2 µm or more can be obtained.

The upper limit of a heating temperature is appropriately selected in accordance with the configuration of the image receiving sheet. In the case of a sheet including an adhesion layer on its back surface such as sealing paper, when the temperature is set to as high as 120° C. or more, an inconvenience in which the adhesion layer hardly peels occurs. Accordingly, the following is selected: the sheet is heated at a temperature lower than 120° C.

Meanwhile, also when the printing heat quantity of the surface protective layer is adjusted, a printed product in which the compound represented by the general formula (1) of the present disclosure permeates into the coloring material receiving layer to a depth of 2 µm or more can be obtained. In, for example, the case where the transfer heat quantity of the surface protective layer is adjusted within the range of from 60% to 90% of the heat quantity with which the maximum density of the yellow coloring material layer is obtained, the compound represented by the general formula (1) of the present disclosure can be caused to permeate into the coloring material receiving layer to a depth of 2 µm or more. In this case, when the transfer heat quantity of the surface protective layer is set to more than 90%, such an inconvenience as described below may occur: the surface protective layer does not peel from a substrate.

In addition, the heating of the printed product and the adjustment of the printing heat quantity of the surface protective layer may be combined.

(I) Thermal Transfer Recording Sheet

The thermal transfer recording sheet according to the present disclosure includes a substrate, and includes, on the substrate, at least the yellow coloring material layer and the surface protective layer forming layer field sequentially.

The yellow coloring material layer is a layer for forming a yellow image on the image receiving sheet. The yellow coloring material layer contains at least one or more kinds of compounds each represented by the general formula (1).

The surface protective layer forming layer is a layer for forming a surface protective layer for protecting the surface of an image formed on the image receiving sheet.

The construction of the thermal transfer recording sheet is described in detail below.

(I-1) Substrate

The substrate of the thermal transfer recording sheet according to the present disclosure is configured to support at least the above-mentioned coloring material layer. The substrate is not particularly limited, and a substrate that is conventionally known in the field of a thermal transfer recording sheet, and has moderate heat resistance and moderate strength may be used.

Examples of the substrate include a polyethylene terephthalate film, a polyethylene naphthalate film, a polycarbonate film, a polyimide film, a polyamide film, an aramid film, a polystyrene film, a 1,4-polycyclohexylenedimethylene terephthalate film, a polysulfone film, a polypropylene film, a polyphenylene sulfide film, a polyvinyl alcohol film, a cellophane film, a cellulose derivative film, a polyethylene film, a polyvinyl chloride film, a nylon film, capacitor paper, and paraffin paper. Of those, a polyethylene terephthalate film is preferred as the substrate from the viewpoints of having excellent mechanical strength, solvent resistance, and economical efficiency.

The thickness of the substrate to be used preferably falls within the range of from 0.5 µm or more to 50 µm or less. The thickness of the substrate to be used more preferably falls within the range of from 3 µm or more to 10 µm or less from the viewpoint that excellent transferability can be obtained.

When a composition (ink) containing a dye is applied onto the substrate for forming each coloring material layer, the wettability, adhesive property, and the like of the coating liquid (dye composition) may be insufficient. Accordingly, the application surface of the substrate is preferably subjected to an adhesion treatment as required.

The adhesion treatment is not particularly limited, and a method known in the field of a thermal transfer recording sheet may be used. Examples of the adhesion treatment may include an ozone treatment, a corona discharge treatment, a UV treatment, a plasma treatment, a low-temperature plasma treatment, a primer treatment, and a chemical treatment. In addition, two or more of those treatments may be performed in combination.

In addition, a method involving applying an adhesion layer onto the substrate may be used as the adhesion treatment for the substrate. The adhesion layer is not particularly limited, and an adhesion layer known in the field of a thermal transfer recording sheet may be used. Examples of a material to be used for the adhesion layer include: organic materials, such as a polyester resin, a polystyrene resin, a polyacrylate resin, a polyamide resin, a polyether resin, a polyvinyl acetate resin, a polyethylene resin, a polypropylene resin, a polyvinyl chloride resin, a polyvinyl alcohol resin, and a polyvinyl butyral resin; and inorganic fine particles, such as silica, alumina, magnesium carbonate, magnesium oxide, and titanium oxide.

A heat-resistant slipping layer is preferably arranged on the surface of the substrate opposite to the surface on which the coloring material layers are present for the purpose of improving the heat resistance of the substrate and the traveling performance of a thermal head.

The heat-resistant slipping layer is formed of a layer containing a heat-resistant resin. The heat-resistant resin is not particularly limited, and examples thereof include: a polyvinyl butyral resin, a polyvinyl acetal resin, a polyester resin, a polyether resin, a polybutadiene resin, a vinyl chloride-vinyl acetate copolymer resin, a styrene-butadiene copolymer resin, polyurethane acrylate, polyester acrylate, a polyimide resin, and a polycarbonate resin.

In addition, the heat-resistant slipping layer may contain an additive, such as a crosslinking agent, a release agent, a lubricant, and a slipperiness-imparting agent.

Examples of the lubricant include an amino-modified silicone compound and a carboxy-modified silicone compound.

The slipperiness-imparting agent is, for example, fine particles of silica or the like serving as heat-resistant fine particles.

The heat-resistant slipping layer may be formed by: applying a heat-resistant slipping layer application liquid, which is prepared by adding the above-mentioned heat-resistant resin, the additive, and the like to a solvent, and dissolving or dispersing the materials in the solvent, to the substrate; and drying the liquid. A method of applying the heat-resistant slipping layer application liquid is not particularly limited, and a method involving using, for example, a bar coater, a gravure coater, a reverse roll coater, a rod coater, or an air doctor coater may be used. Of those, an application method involving using a gravure coater by which the thickness of the layer is easily adjusted is preferred.

With regard to the amount of the heat-resistant slipping layer application liquid to be applied to the substrate, from the viewpoint that excellent transferability can be obtained, the liquid is preferably applied in such an amount that the thickness of the heat-resistant slipping layer after the drying falls within the range of from 0.1 μm or more to 5 μm or less.

(I-2-1) Coloring Material Layer

The thermal transfer recording sheet includes at least the yellow coloring material layer. In addition, the yellow coloring material layer contains the at least one or more kinds of compounds each represented by the general formula (1). One kind of the compounds each represented by the general formula (1) may be used alone, or two or more kinds thereof may be used in combination for adjusting the color tone or the like of an image to be formed in accordance with applications. Further, the compound may be used in combination with a dye known as a dye for thermal transfer.

In addition, a magenta coloring material layer and a cyan coloring material layer may be arranged adjacent to the yellow coloring material layer. Dyes conventionally known as dyes for thermal transfer may be used in the magenta and cyan coloring material layers.

(I-2-2) Component in Coloring Material Layer

Each component in the coloring material layer is described below.

(i) Compound Represented by General Formula (1)

First, the compound represented by the general formula (1) is described.

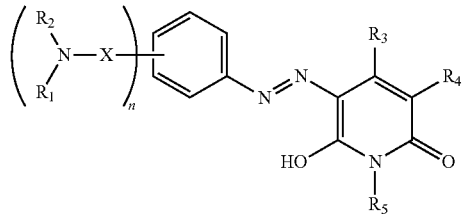

General formula (1)

In the general formula (1), $R_1$ and $R_2$ each independently represent a hydrogen atom, or a linear, branched, or cyclic alkyl group having 1 to 20 carbon atoms, $R_3$ represents a linear or branched alkyl group having 1 to 4 carbon atoms, a phenyl group, or an unsubstituted amino group, $R_4$ represents a hydrogen atom, a cyano group (—CN), an unsubstituted carbamoyl group (—C(=O)NH$_2$), a carboxylic acid ester group, or a carboxylic acid amide group, $R_5$ represents a hydrogen atom, a linear, branched, or cyclic alkyl group having 1 to 20 carbon atoms, or —N(—R$_6$)R$_7$, $R_6$ and $R_7$ each represent a linear or branched alkyl group having 1 to 8 carbon atoms, an unsubstituted aryl group, an aryl group having a substituent, an unsubstituted acyl group, or an acyl group having a substituent, or represent —N(—R$_6$)R$_7$, $R_6$ and $R_7$ satisfy the following specification (i) or (ii):

(i) $R_6$ and $R_7$ each independently represent a hydrogen atom, a linear or branched alkyl group having 1 to 8 carbon atoms, an aryl group, or an acyl group; and (ii) $R_6$ and $R_7$ are bonded to each other to form a ring, and $R_6$ and $R_7$ each represent an atomic group required for forming the ring, and X represents a carbonyl group or a sulfonyl group, and "n" represents an integer of from 1 to 3.

<$R_1$ and $R_2$>

An example of the alkyl group represented by each of $R_1$ and $R_2$ is a linear, branched, or cyclic alkyl group having 1 to 20 carbon atoms.

More specific examples thereof include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

$R_1$ and $R_2$ preferably each independently represent any one of the following alkyl groups out of those alkyl groups because a printed product having a high density and high light fastness is easily obtained. That is, an ethyl group, a n-butyl group, a sec-butyl group, a dodecyl group, a cyclohexyl group, a methylcyclohexyl group, a 2-ethylpropyl group, or a 2-ethylhexyl group is preferred, and a n-butyl group or a 2-ethylhexyl group is more preferred.

In addition, a case in which X represents a carbonyl group, and $R_1$ and $R_2$ represent the same alkyl group is preferred because a printed product having a high density and high light fastness can be obtained.

<$R_3$>

Examples of the alkyl group represented by $R_3$ include linear or branched alkyl groups each having 1 to 4 carbon atoms, such as a methyl group, an ethyl group, a propyl group, and a butyl group.

$R_3$ represents not only the alkyl group but also a phenyl group or an unsubstituted amino group. However, $R_3$ preferably represents the alkyl group out of those groups because a printed product having a high density and high light fastness is easily obtained. Further, $R_3$ more preferably represents a methyl group from the same viewpoint.

<$R_4$>

Examples of the carboxylic acid ester group represented by $R_4$ include a carboxylic acid methyl ester group, a carboxylic acid ethyl ester group, and a carboxylic acid phenyl ester group.

Examples of the carboxylic acid amide group represented by $R_4$ include a carboxylic acid methylamide group, a carboxylic acid butylamide group, a carboxylic acid phenylamide group, a carboxylic acid ethylamide group, a carboxylic acid dimethylamide group, and a carboxylic acid diethylamide group.

<$R_5$>

An example of the alkyl group represented by $R_5$ is a linear, branched, or cyclic alkyl group having 1 or more and 20 or less carbon atoms.

More specific examples thereof include a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

Of those alkyl groups, a methyl group, an ethyl group, a n-propyl group, an iso-propyl group, a n-butyl group, and a 2-ethylhexyl group are preferred because a printed product having a high density and high light fastness is easily obtained. Further, in particular, an ethyl group and a n-propyl group are more preferred from the same viewpoint.

Specific examples of the aryl group represented by $R_5$ include a phenyl group, a 4-methylphenyl group, and a 4-methoxyphenyl group.

<$R_6$ and $R_7$>

Specific examples of the linear or branched alkyl group having 1 to 8 carbon atoms represented by each of $R_6$ and $R_7$ include a methyl group, an ethyl group, a n-propyl group, an iso-propyl group, a n-butyl group, a sec-butyl group, a tert-butyl group, a 2-ethylpropyl group, and a 2-ethylhexyl group. Of those alkyl groups, a methyl group, an ethyl group, a butyl group, and a 2-ethylhexyl group are more preferred because a printed product having a high density and high light fastness is easily obtained.

Examples of the acyl group represented by each of $R_6$ and $R_7$ include alkylcarbonyl groups, such as an acetyl group (—C(=O)CH$_3$) and an ethylhexanoyl group (—C(=O)C(—C$_2$H$_5$)—(CH$_2$)$_3$CH$_3$), and arylcarbonyl groups such as a benzoyl group (—C(=O)—C$_6$H$_5$).

Examples of the ring formed by the bonding of $R_6$ and $R_7$ to each other include a pyrrolidine ring, a piperidine ring, an azepane ring, and an azocane ring from the viewpoint that a printed product having a high density and high light fastness can be obtained.

A case in which at least one of $R_6$ or $R_7$ represents the alkyl group out of those groups is preferred because a printed product having a high density and high light fastness can be obtained. Further, a case in which at least one of $R_6$ or $R_7$ represents a methyl group is more preferred from the same viewpoint.

In the general formula (1), X represents a carbonyl group or a sulfonyl group. A case in which X represents a carbonyl group is preferred because a printed product having a high density and high light fastness can be obtained.

In the general formula (1), "n" represents an integer of from 1 to 3. A case in which "n" represents 1 is preferred because a printed product having a high density and high light fastness is easily obtained.

An azo form is shown in the general formula (1), but a tautomer that is a hydrazo form is also included in the scope of the present disclosure.

Compounds (1-1) to (1-15) are shown below as specific examples of the compound represented by the general formula (1), but the compound represented by the general formula (1) is not limited to the following compounds.

Compound (1-1)

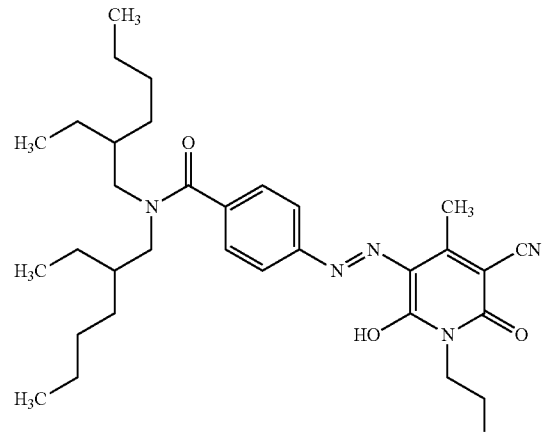

Compound (1-2)

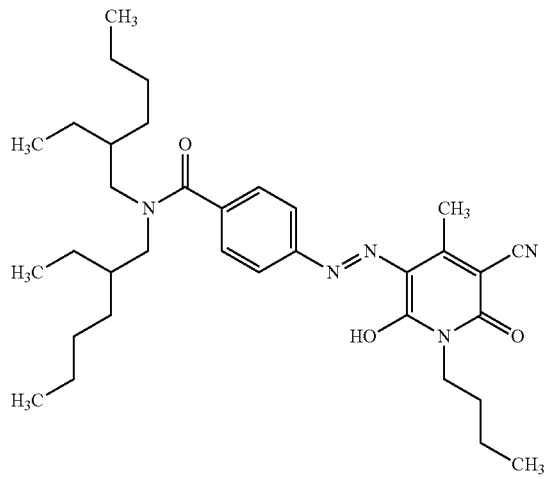

(Compound 1-3)
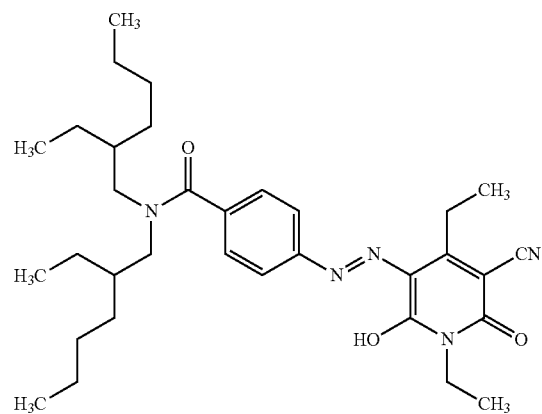
Compound (1-4)
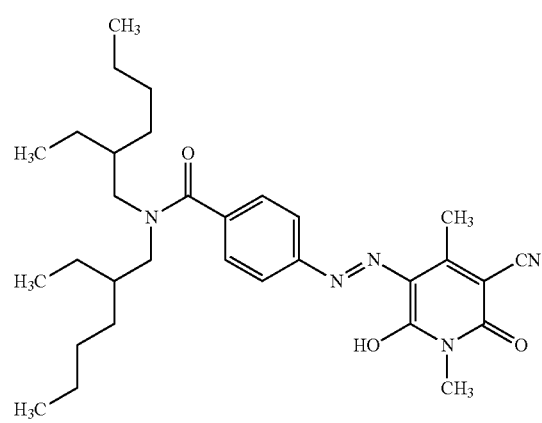
Compound (1-5)
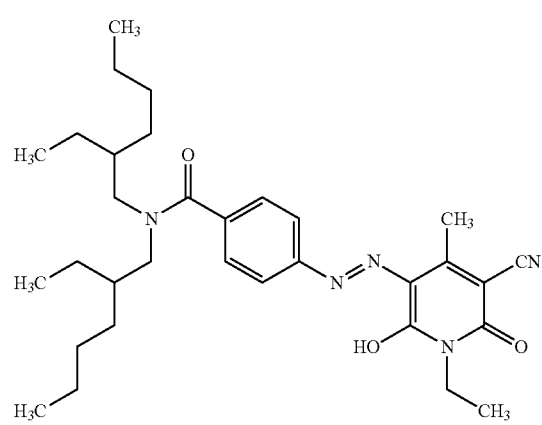
Compound (1-6)
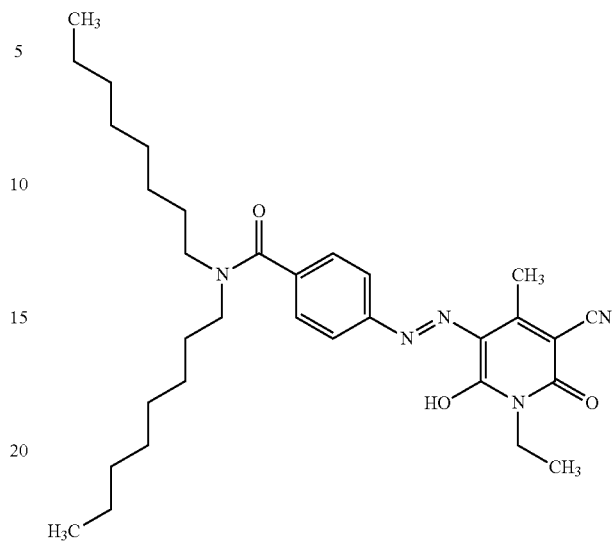
Compound (1-7)
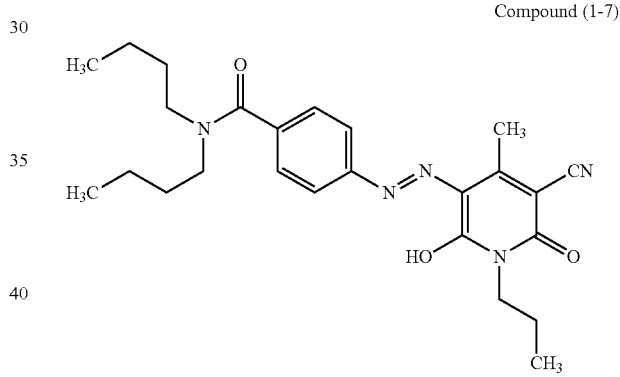
Compound (1-8)
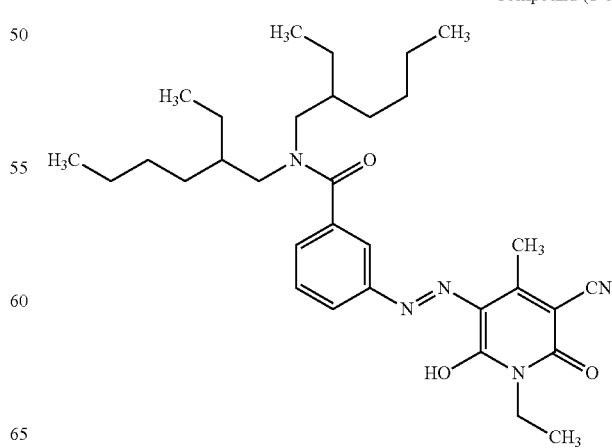

Compound (1-9)
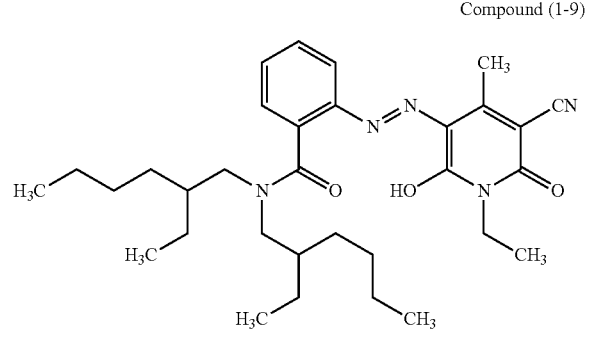
Compound (1-10)
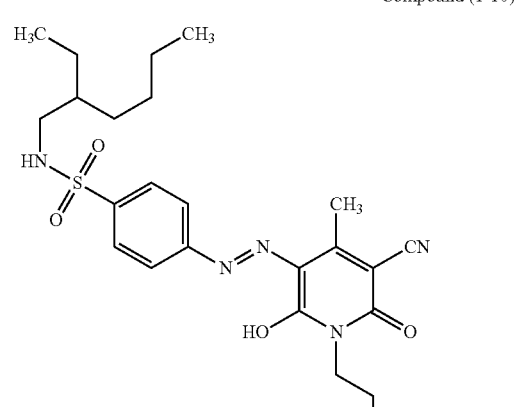
Compound (1-11)
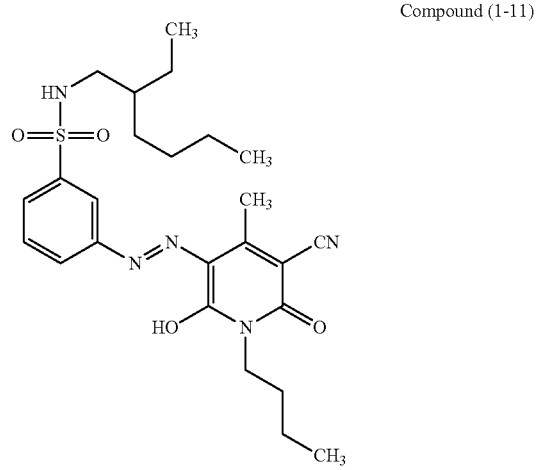
Compound (1-12)
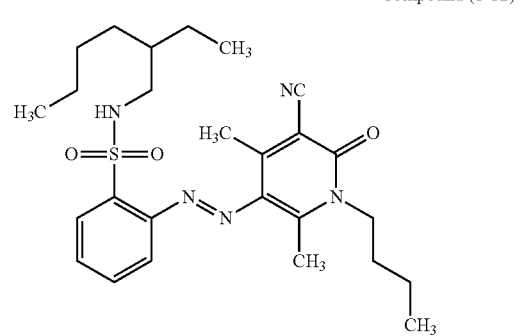
Compound (1-13)
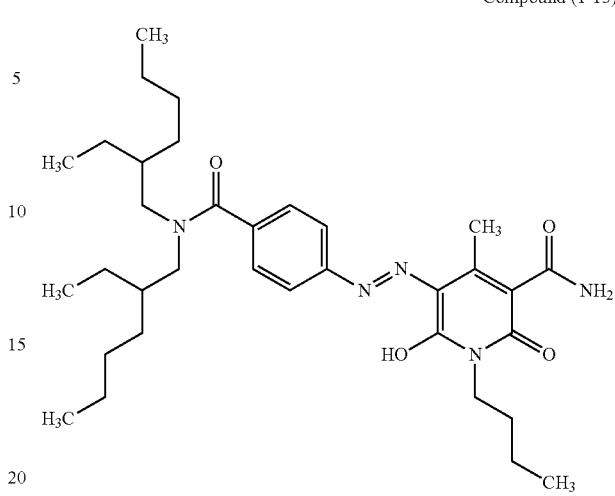
Compound (1-14)
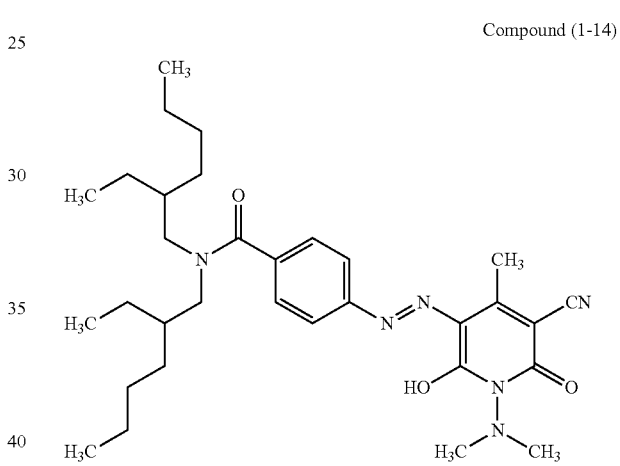
Compound (1-15)
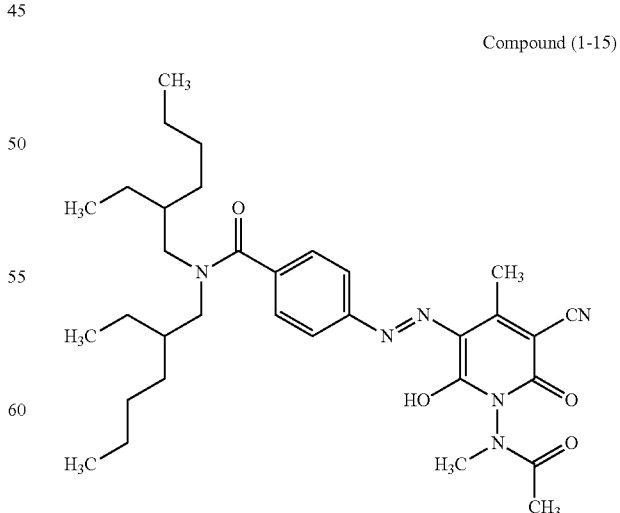
X, $R_1$, $R_2$, $R_3$, $R_4$, $R_5$, $R_6$, and $R_7$ of each of Compounds (1-1) to (1-15) are shown in Table 1.

TABLE 1

| Compound | X | $R_1$ | $R_2$ | $R_3$ | $R_4$ | $R_5$ | $R_6$ | $R_7$ |
|---|---|---|---|---|---|---|---|---|
| 1-1 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —CN | —C$_3$H$_7$ | — | — |
| 1-2 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —CN | —C$_4$H$_9$ | — | — |
| 1-3 | —C(=O)— | —CH$_2$CH(—C$_2$H$_5$)—C$_4$H$_9$ | —CH$_2$CH(—C$_2$H$_5$)—C$_4$H$_9$ | —C$_2$H$_5$ | —CN | —C$_2$H$_5$ | — | — |
| 1-4 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —CN | —CH$_3$ | — | — |
| 1-5 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —CN | —C$_2$H$_5$ | — | — |
| 1-6 | —C(=O)— | —C$_8$H$_{17}$ | —C$_8$H$_{17}$ | —CH$_3$ | —CN | —C$_2$H$_5$ | — | — |
| 1-7 | —C(=O)— | —C$_4$H$_9$ | —C$_4$H$_9$ | —CH$_3$ | —CN | —C$_3$H$_7$ | — | — |
| 1-8 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —CN | —C$_2$H$_5$ | — | — |
| 1-9 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —CN | —C$_2$H$_5$ | — | — |
| 1-10 | —S(=O)$_2$— | H | —CH$_2$CH(—C$_2$H$_5$)—C$_4$H$_9$ | —CH$_3$ | —CN | —C$_4$H$_9$ | — | — |
| 1-11 | —S(=O)$_2$— | H | —CH$_2$CH(—C$_2$H$_5$)—C$_4$H$_9$ | —CH$_3$ | —CN | —C$_4$H$_9$ | — | — |
| 1-12 | —S(=O)$_2$— | H | —CH$_2$CH(—C$_2$H$_5$)—C$_4$H$_9$ | —CH$_3$ | —CN | —C$_4$H$_9$ | — | — |
| 1-13 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —C(=O)—NH$_2$ | —C$_4$H$_9$ | — | — |
| 1-14 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —CN | —N< | —CH$_3$ | —CH$_3$ |
| 1-15 | —C(=O)— | —CH$_2$CH(—C$_2$H$_5$)—C$_4$H$_9$ | —CH$_2$CH(—C$_2$H$_5$)—C$_4$H$_9$ | —CH$_3$ | —CN | —N< | —CH$_3$ | —C(=O)—CH$_3$ |

At least one kind of Compounds (1-3) to (1-5) and (1-10) described above is preferably used as the compound represented by the general formula (1) because a printed product having a high density and high light fastness can be obtained.

One kind of the compounds each represented by the general formula (1) may be used alone, or two or more kinds thereof may be used in combination for adjusting the color tone or the like of an image to be formed in accordance with applications. Further, the compound may be used in combination with a known pigment or dye. The number of kinds of the known pigments or dyes to be combined with the compound may be two or more.

(iii) Binder Resin

A binder resin that may be used in each coloring material layer of the thermal transfer recording sheet is not particularly limited, and various resins may each be used. Of those, the following water-soluble resins and organic solvent-soluble resins are each preferably used.

Water-soluble resins: a cellulose resin, a polyacrylic acid resin, a starch resin, an epoxy resin, and the like.

Organic solvent-soluble resins: a polyacrylate resin, a polymethacrylate resin, a polystyrene resin, a polycarbonate resin, a polyethersulfone resin, a polyvinyl butyral resin, an ethyl cellulose resin, an acetyl cellulose resin, a polyester resin, an AS resin, a phenoxy resin, and the like.

Those binder resins may be used alone or in combination thereof as required.

(iv) Surfactant

A surfactant may be added to each coloring material layer of the thermal transfer recording sheet for imparting sufficient lubricity at the time of the heating of a thermal head (at the time of printing). Examples of the surfactant that may be added to each coloring material layer include a cationic surfactant, an anionic surfactant, and a nonionic surfactant.

Examples of the cationic surfactant include dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactant include fatty acid soaps, such as sodium stearate and sodium dodecanoate, sodium dodecyl sulfate, sodium dodecylbenzene sulfate, and sodium lauryl sulfate.

Examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

(v) Wax

A wax may be added to each coloring material layer of the thermal transfer recording sheet for imparting sufficient lubricity at the time of the non-heating of the thermal head. Examples of the wax that may be added to each coloring material layer include, but not limited to, a polyethylene wax, a paraffin wax, and a fatty acid ester wax.

(vi) Other Additives

In addition to the above-mentioned additives, a UV absorber, an antiseptic, an antioxidant, an antistatic agent, a viscosity modifier, and the like may each be added to each coloring material layer of the thermal transfer recording sheet as required.

(vii) Medium

A medium that may be used in the preparation of each dye composition for the thermal transfer recording sheet is not particularly limited, and examples thereof include water and an organic solvent. For example, the following organic solvents may each be preferably used as the organic solvent: alcohols, such as methanol, ethanol, isopropanol, and isobutanol; cellosolves, such as methyl cellosolve and ethyl cellosolve; aromatic hydrocarbons, such as toluene, xylene, and chlorobenzene; esters, such as ethyl acetate and butyl acetate; ketones, such as acetone, methyl ethyl ketone, methyl isobutyl ketone, and cyclohexanone; halogenated hydrocarbons, such as methylene chloride, chloroform, and trichloroethylene; ethers, such as tetrahydrofuran and dioxane; and N,N-dimethylformamide and N-methylpyrrolidone. Those organic solvents may be used alone or in combination thereof as required. In addition, water and the organic solvent may be used in combination thereof.

(I-2-3) Composition of Dye Composition for Forming Coloring Material Layer

Content (Usage Amount) of Dye

The usage amount of each coloring material in each dye composition is preferably from 1 part by mass to 200 parts by mass in total with respect to 100 parts by mass of the binder resin from the viewpoint of the storage stability of the sheet. The amount is more preferably from 50 parts by mass to 180 parts by mass with respect to 100 parts by mass of the binder resin from the viewpoint of the dispersibility of the coloring material. When two or more kinds of coloring materials are used as a mixture, the usage amount of the coloring materials means the total number of parts by mass of the respective coloring materials. For example, when the compound represented by the general formula (1) and an existing dye are used in combination as yellow dyes, the usage amount of the dyes means the total number of parts by mass of these dyes.

Content (Usage Amount) of Other Component

The usage amount of any other component (additive) may be appropriately set, and is not particularly limited.

(I-2-4) Surface Protective Layer Forming Layer

The thermal transfer recording sheet includes, on the substrate, the surface protective layer forming layer for protecting the surface of an image after the formation of the image and the above-mentioned coloring material layer field sequentially.

A binder resin to be used in the surface protective layer forming layer is not particularly limited, and suitable examples thereof include: acrylic resins, such as polystyrene, polymethyl methacrylate, and polyethyl acrylate; styrene-based resins such as poly-α-methyl styrene; vinyl-based resins, such as polyvinyl chloride, polyvinyl acetate, a vinyl chloride-vinyl acetate copolymer, polyvinyl butyral, and polyvinyl acetal; and synthetic resins, such as a polyamide resin, an epoxy resin, a polyurethane resin, a petroleum resin, an ionomer, an ethylene-acrylic acid copolymer, and an ethylene-acrylic acid ester copolymer.

The thickness of the surface protective layer forming layer is preferably from about 0.1 μm to about 5 μm.

In addition, the thermal transfer recording sheet more preferably includes, below the layer containing the compound, a peeling layer, which contains, for example, an acrylic resin, such as polymethyl methacrylate or polyethyl acrylate, and has a thickness of from about 0.1 μm to about 1.5 μm, for facilitating the peeling of the layer from the sheet.

A transferable surface protective layer includes the peeling layer, and hence can be transferred by applying a small quantity of heat. The heat quantity is about 20% of the maximum heat quantity with which the coloring material layer is transferred.

(II) Thermal Transfer Image Receiving Sheet (Image Receiving Sheet)

The image receiving sheet is described in detail. The image receiving sheet includes at least one coloring material receiving layer on a substrate.

The image receiving sheet preferably includes at least one intermediate layer (e.g., a heat insulating layer (porous layer)) between the substrate and the coloring material receiving layer. In addition, for example, a gloss controlling layer, a white background adjusting layer, a concealing performance improving layer, a solvent resistance improving layer, a charge regulating layer, an adhesion layer, or a primer layer may be included as an intermediate layer except the heat insulating layer. Further, a curl adjusting layer, a writing layer, or a charge adjusting layer may be formed on the rear surface side of the substrate of the image receiving sheet.

The respective layers may be formed by application or bonding. A method for the application is not particularly limited, and a generally known production method, such as roll coating, bar coating, gravure coating, microgravure reverse coating, curtain coating, slide hopper coating, or die coating, may be used.

<Substrate for Image Receiving Sheet>

Although the substrate that may be used in the image receiving sheet is not particularly limited, for example, a polyester film made of polyethylene terephthalate or the like, a polyolefin film made of polypropylene, polyethylene, or the like, a synthetic resin film made of polyvinyl chloride, polycarbonate, polystyrene, polyamide, or the like, wood-free paper, coated paper, resin-coated paper that is photograph base paper (paper obtained by laminating polyethylene, polypropylene, or the like on each of both the surfaces of middle paper mainly formed of broadleaf tree pulp), art paper, cast-coated paper, resin-laminated paper, and synthetic paper (product name: YUPO CORPORATION YUPO FPG) may be used alone, or may be used in combination thereof as a composite.

The thickness of the substrate is preferably from 50 μm to 300 μm in consideration of the conveyability of a printer and the body of the printed product.

<Heat Insulating Layer>

A heat insulating layer for improving thermal efficiency at the time of printing to increase a printing density is preferably arranged on the substrate of the image receiving sheet.

Although the heat insulating layer is not particularly limited, for example, a polyester film (e.g., a product available under the product name "TOYOBO CRISPER") made of polyethylene terephthalate or the like, or a biaxially stretched film (e.g., a product available under the product name "TOYOBO TOYOPEARL" or "YUPO CORPORATION YUPO FPG") having voids (pores), the film including a polyolefin film made of polypropylene, polyethylene, or the like, and a filler, such as calcium carbonate or titanium oxide, as main components, may be used.

In addition, a heat insulating layer having a void structure may be formed on the substrate. Although a method for the formation is not particularly limited, a void layer is formed by, for example, applying hollow particles such as microcapsules (the particles may each contain a foaming solvent) onto the substrate together with a binder, and thermally drying the resultant.

<Intermediate Layer Except Heat Insulating Layer>

As described above, the image receiving sheet may include, for example, a gloss controlling layer, a white background adjusting layer, a concealing performance improving layer, a solvent resistance improving layer, a charge regulating layer, an adhesion layer, or a primer layer as an intermediate layer except the heat insulating layer. The intermediate layer may be a multilayer structure.

<Coloring Material Receiving Layer>

The coloring material receiving layer of the image receiving sheet of the present disclosure has a function of receiving a dye that is caused to migrate from an ink sheet by sublimation or thermal diffusion to form an image.

A resin that may be used in the coloring material receiving layer is not particularly limited, and examples thereof include: halogenated polymers, such as polyvinyl chloride and polyvinylidene chloride; vinyl-based resins, such as polyvinyl acetate, an ethylene-vinyl acetate copolymer, and a vinyl chloride-vinyl acetate copolymer; acrylic resins such as a polyacrylic acid ester; polyolefin-based resins such as polypropylene; acetal resins, such as polyvinyl formal, polyvinyl butyral, and polyvinyl acetal; saturated and unsaturated various polyester resins; a polycarbonate-based resin; cellulose-based resins such as cellulose acetate; styrene-based resins, such as polystyrene, an acryl-styrene copolymer, and an acrylonitrile-styrene copolymer; a urea resin; a melamine resin; and a polyamide resin. Those resins may be arbitrarily mixed to the extent that the resins are compatible with each other.

In addition, a water-soluble resin or an aqueous dispersion resin may be used as a binder resin. Although the water-soluble resin is not particularly limited, examples thereof include polyvinyl alcohol, polyvinylpyrrolidone, and gelatin. The aqueous dispersion resin is, for example, an emulsion or a dispersion of a vinyl chloride-based resin, an acrylic resin, a urethane resin, or the like.

The resin of the coloring material receiving layer may thermally fuse with the binder resin of the ink sheet at the time of the thermal transfer of image formation. Accordingly, a release agent may be added to the layer. To obtain releasability, a release agent, such as a silicone compound, a silicone oil, a silicone resin, a phosphoric acid ester, a surfactant, a fluorine-based compound, or a fluorine-based resin, is preferably added to the coloring material receiving layer, and a product obtained by adding a modified silicone oil to the layer and curing the resultant is particularly preferred.

One or two or more kinds of the release agents are used. In addition, the dry application amount of the release agent is from about 0.001 g/m² to about 1 g/m². When the addition amount range is not satisfied, the fusion of the ink sheet and the coloring material receiving layer of the image receiving sheet, or a reduction in printing sensitivity of the ink receiving sheet may occur. When the release agent is added to the coloring material receiving layer, the release agent bleeds to its surface to form a release layer. In addition, those release agents may each be separately applied onto the coloring material receiving layer instead of being added into the resin of the coloring material receiving layer.

Further, the release agent may be used in combination with a surfactant, a defoaming agent, or the like for its dispersion or the leveling of the coloring material receiving layer. In addition, a white pigment, a fluorescent bleach, or the like may be added for the purpose of improving the whiteness degree of the coloring material receiving layer.

Although the coloring material receiving layer may have any thickness, its thickness is preferably from 3 μm to 6 μm.

EXAMPLES

The present disclosure is described in more detail below by way of Examples and Comparative Examples, but the present disclosure is not limited to these examples. The term "part(s)" as used in the following description is on a mass basis unless otherwise stated.

[Compound Represented by General Formula (1) of the Present Disclosure]

The compound represented by the general formula (1) was synthesized by a known method. The compound was identified by using a ¹H nuclear magnet resonance (¹H-NMR) spectrometer (AVANCE-600 NMR Spectrometer, manufactured by Bruker) and a MALDI-TOF/MS (MALDI-TOF/MS ultraFleXtreme, manufactured by Bruker) apparatus.

[Comparative Compounds]

The following Comparative Compounds (1) to (3) were used as comparative compounds.

Comparative Compound (1)

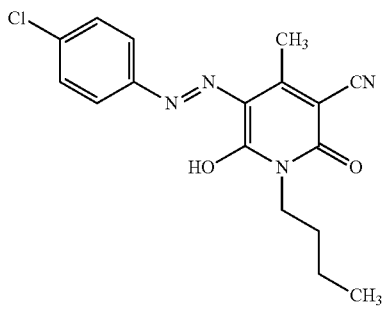

Comparative Compound (2)

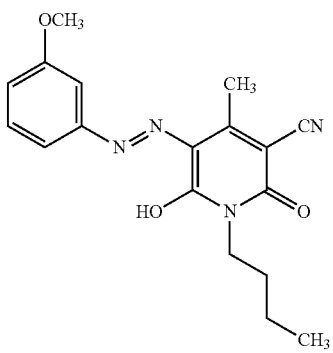

Comparative Compound (3)

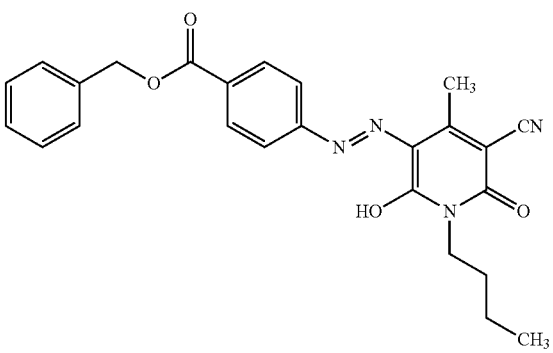

(I) Thermal Transfer Recording Sheet

Production of Dye Compositions

Ink Production Example 1

5 Parts of a polyvinyl butyral resin (product name: KS-3, manufactured by Sekisui Chemical Co., Ltd.) was gradually added to and dissolved in a mixed solution of 45 parts of methyl ethyl ketone and 45 parts of toluene. 5 Parts of Compound (1-5) was added to and completely dissolved in the solution. Thus, a yellow dye composition (yellow ink) (Y1) for producing a thermal transfer recording sheet was obtained.

Ink Production Examples 2 to 9

Yellow dye compositions (yellow inks) (Y2 to Y9) for producing thermal transfer recording sheets were each produced by the same method as that of Ink Production Example 1 described above except that Compound (1-5) was changed to a compound shown in Table 2.

Production of Image Sample

Example 1

A polyethylene terephthalate film having a thickness of 4.5 μm (product name: LUMIRROR, manufactured by Toray Industries, Inc.) was used as a substrate. The above-mentioned yellow dye composition (Y1) for producing a thermal transfer recording sheet was applied onto the substrate so that its thickness after drying became 1 followed by drying. Thus, a yellow coloring material layer was formed.

The yellow, magenta, and cyan coloring material layers of the color ink ribbon of a color ink/paper set KL-361P (product name) for a Selphy (product name) manufactured by Canon Inc. were cut out, and the above-mentioned yellow coloring material layer was bonded instead to each of the remaining portions, followed by the connection of the resultant to the surface protective layer of the KL-361P. Thus, an ink ribbon was produced.

Next, a yellow image measuring 3 cm by 3 cm was formed on the printing paper (image receiving sheet) of the KL-361P with a reconstructed machine of a Selphy (product name) manufactured by Canon Inc. At the time of the formation of the yellow image, a heat quantity corresponding to 80% with respect to the heat quantity with which the maximum density of the yellow image was able to be obtained was supplied to the yellow coloring material layer.

The produced yellow image was loaded into an oven at 90° C. for 1 minute, and then a surface protective layer was formed on the yellow image with the reconstructed machine of the Selphy (product name) manufactured by Canon Inc. Thus, an image sample of Example 1 was obtained. The surface protective layer was formed with a heat quantity corresponding to 50% with respect to the heat quantity with which the maximum density of the yellow image was able to be obtained.

Examples 2 to 7 and Comparative Examples 1 to 3

Image samples of Examples 2 to 7 and Comparative Examples 1 to 3 were each obtained in the same manner as in Example 1 except that in Example 1, the compound to be incorporated as a yellow coloring material and the temperature of the oven were changed as shown in Table 2.

Example 8

An image sample of Example 8 was obtained by forming a surface protective layer without heating the produced yellow image in the oven. The surface protective layer was formed with a heat quantity corresponding to 60% with respect to the heat quantity with which the maximum density of the yellow image was able to be obtained.

Examples 9 to 14 and Comparative Examples 4 to 8

Image samples of Examples 9 to 14 and Comparative Examples 4 to 8 were each obtained in the same manner as in Example 8 except that in Example 8, the compound to be incorporated as a yellow coloring material and the heat quantity at the time of forming the surface protective layer were changed as shown in Table 2.

Example 15

The produced yellow image was heated in the oven to 70° C. in the same manner as in Example 1, and then a surface protective layer was printed thereon. Thus, an image sample of Example 15 was obtained. The surface protective layer was formed with a heat quantity corresponding to 70% with respect to the heat quantity with which the maximum density of the yellow image was able to be obtained.

Example 16

The produced yellow image was heated in the oven to 70° C. in the same manner as in Example 1, and then a surface protective layer was printed thereon. Thus, an image sample of Example 16 was obtained. The surface protective layer was formed with a heat quantity corresponding to 60% with respect to the heat quantity with which the maximum density of the yellow image was able to be obtained.

A section was cut out of each of the output images by a razor method, and the permeation depth of the coloring material of the image was measured with a laser microscope (LSM5 Pascal manufactured by Carl Zeiss AG). The results are shown in Table 2.

TABLE 2

| | Ribbon | Coloring material | Heating condition (° C.) | Ratio (%) of applied heat quantity at time of formation of protective layer | Permeation depth (μm) |
|---|---|---|---|---|---|
| Example 1 | Y1 | Compound (1-5) | 90 | 50 | 2.1 |
| Example 2 | Y1 | Compound (1-5) | 110 | 50 | 2.3 |
| Example 3 | Y2 | Compound (1-3) | 120 | 50 | 3.6 |
| Example 4 | Y3 | Compound (1-4) | 100 | 50 | 3.0 |
| Example 5 | Y4 | Compound (1-10) | 110 | 50 | 2.2 |
| Example 6 | Y5 | Compound (1-2) | 80 | 50 | 2.1 |
| Example 7 | Y6 | Compound (1-8) | 70 | 50 | 2.0 |
| Example 8 | Y1 | Compound (1-5) | — | 60 | 2.8 |
| Example 9 | Y1 | Compound (1-5) | — | 80 | 4.1 |
| Example 10 | Y2 | Compound (1-3) | — | 80 | 4.0 |
| Example 11 | Y3 | Compound (1-4) | — | 70 | 3.0 |
| Example 12 | Y4 | Compound (1-10) | — | 75 | 3.2 |
| Example 13 | Y5 | Compound (1-2) | — | 55 | 2.1 |
| Example 14 | Y6 | Compound (1-8) | — | 95 | 4.2 |
| Example 15 | Y2 | Compound (1-3) | 70 | 70 | 3.5 |
| Example 16 | Y2 | Compound (1-3) | 70 | 60 | 3.2 |
| Comparative Example 1 | Y7 | Comparative Compound (1) | 90 | 50 | 0.5 |
| Comparative Example 2 | Y8 | Comparative Compound (2) | 120 | 50 | 1.0 |
| Comparative Example 3 | Y9 | Comparative Compound (3) | 100 | 50 | 0.8 |
| Comparative Example 4 | Y7 | Comparative Compound (1) | — | 60 | 0.4 |
| Comparative Example | Y8 | Comparative | — | 80 | 1.2 |

TABLE 2-continued

| | Ribbon | Coloring material | Heating condition (° C.) | Ratio (%) of applied heat quantity at time of formation of protective layer | Permeation depth (μm) |
|---|---|---|---|---|---|
| Example 5 Comparative Example 6 | Y9 | Compound (2) Comparative Compound (3) | — | 70 | 0.9 |
| Comparative Example 7 | Y3 | Compound (1-6) | — | 20 | 0.5 |
| Comparative Example 8 | Y2 | Compound (1-9) | — | 30 | 0.6 |

Next, the density evaluation and light fastness evaluation of each of the image samples of Examples 1 to 16 and Comparative Examples 1 to 8 described above were performed. The colorimetry of each of the image samples was performed with a reflection densitometer FD-7 (product name, manufactured by Konica Minolta, Inc.). The results are shown in Table 3.

<Density Evaluation>

The optical density (O.D.) of each of the yellow images printed as described above was measured, and was evaluated (ranked) based on the following evaluation criteria. Those respective values and their evaluation results are shown in Table 3.

Evaluation criteria:
  Rank A (extremely satisfactory): 2.0≤O.D.
  Rank B (satisfactory): 1.7≤O.D.<2.0
  Rank C (poor): O.D.<1.7

<Light Fastness Evaluation>

Each of the image samples obtained in Examples 1 to 16, and Comparative Examples 1 to 8 was loaded into a xenon tester (product name: AtlasCi4000, manufactured by Suga Test Instruments Co., Ltd.), and was exposed for 35 hours under the conditions of an illuminance of 0.28 W/m² at 340 nm, a temperature of 40° C., and a relative humidity of 50%.

When the initial optical density (O.D.) of each of the samples was represented by $OD_0$, and the O.D. thereof after the 35 hours of exposure was represented by $OD_{35}$, an O.D. residual ratio was defined as represented by the following equation, and was evaluated (ranked) based on the following evaluation criteria. The results are shown in Table 3.

O.D. residual ratio=100×($OD_{35}/OD_0$)

Evaluation criteria:
  Rank A (extremely satisfactory): 70%≤O.D. residual ratio
  Rank B (satisfactory): 50%≤O.D. residual ratio<70%
  Rank C (poor): O.D. residual ratio<50%

TABLE 3

| | Density | Density evaluation | Light fastness (%) | Light fastness evaluation |
|---|---|---|---|---|
| Example 1 | 2.2 | A | 80 | A |
| Example 2 | 2.2 | A | 82 | A |
| Example 3 | 2.2 | A | 75 | A |
| Example 4 | 2.2 | A | 81 | A |
| Example 5 | 2.2 | A | 85 | A |
| Example 6 | 2.1 | A | 80 | A |
| Example 7 | 2.0 | B | 60 | B |
| Example 8 | 2.2 | A | 71 | A |
| Example 9 | 2.2 | A | 85 | A |
| Example 10 | 2.2 | A | 86 | A |
| Example 11 | 2.2 | A | 79 | A |
| Example 12 | 2.1 | A | 81 | A |
| Example 13 | 2.1 | A | 65 | B |
| Example 14 | 2.0 | B | 80 | A |
| Example 15 | 2.2 | A | 83 | A |
| Example 16 | 2.1 | A | 81 | A |
| Comparative Example 1 | 1.7 | B | 40 | C |
| Comparative Example 2 | 1.0 | C | 65 | B |
| Comparative Example 3 | 1.4 | C | 30 | C |
| Comparative Example 4 | 1.7 | B | 45 | C |
| Comparative Example 5 | 1.0 | C | 65 | B |
| Comparative Example 6 | 1.4 | C | 32 | C |
| Comparative Example 7 | 2.0 | B | 38 | C |
| Comparative Example 8 | 1.9 | B | 41 | C |

Example 17

After the formation of the yellow image in Example 7, a magenta image and a cyan image were formed with a Selphy (product name) manufactured by Canon Inc. so as to be superimposed on the yellow image. At the time of the formation of each of the images, a heat quantity was set to 80% with respect to the heat quantity with which the maximum density of the image was able to be obtained.

After that, a surface protective layer was formed with a heat quantity corresponding to 60% with respect to the heat quantity with which the maximum density of the yellow image was able to be obtained. Thus, a full-color image was obtained. The permeation depth of the yellow coloring material of the full-color image was measured. The permeation depth of the yellow coloring material was 2.8 μm, and was hence the same as that of the image on which neither a magenta coloring material layer nor a cyan coloring material layer was superimposed.

Example 18

A yellow image was formed in the same manner as in Example 1, and then a magenta image and a cyan image were formed with a Selphy (product name) manufactured by Canon Inc. so as to be superimposed on the yellow image. Thus, a printed sample including a natural image was formed. After that, a surface protective layer was subsequently formed.

The printing heat quantity of the surface protective layer was changed by judging whether or not a region where the layer was to be formed was a region where the yellow image was exposed on the natural image. Specifically, in a region where the yellow image was present, image formation was performed with a heat quantity corresponding to 60% of the heat quantity with which the maximum density of the yellow image was obtained, and in a region where the yellow image was not exposed, printing was performed with a heat quantity corresponding to 30% of the heat quantity with which the maximum density of the yellow image was obtained.

As a result, consumption energy required for obtaining a printed product was able to be reduced.

As is apparent from the foregoing, the image samples described in Examples were able to provide printed products each having a higher density and higher light fastness than those of the image samples formed by using the thermal transfer recording sheets of Comparative Examples.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-185268, filed Nov. 12, 2021, and Japanese Patent Application No. 2022-148151, filed Sep. 16, 2022, which are hereby incorporated by reference herein in their entirety.

What is claimed is:

1. A printed product comprising:
a yellow image formed on an image receiving sheet including a coloring material receiving layer and a surface protective layer formed on the yellow image, wherein
the yellow image and the surface protective layer are formed by sequentially applying heat to a yellow coloring material layer for forming the yellow image and a surface protective layer forming layer for forming a surface protective layer through use of a thermal transfer recording sheet including the yellow coloring material layer and the surface protective layer forming layer fields sequentially formed on a substrate;
the yellow coloring material layer contains a compound represented by the following formula (1) as a yellow coloring material, and
wherein in the printed product, the compound represented by formula (1) permeates to a depth of 2 μm or more from a surface of the coloring material receiving layer:

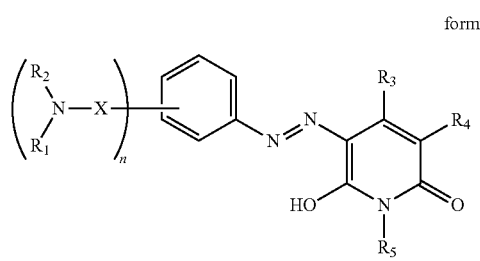

formula (1)

in formula (1),
$R_1$ and $R_2$ each independently represent a hydrogen atom, or a linear, branched, or cyclic alkyl group having 1 to 20 carbon atoms,
$R_3$ represents a linear or branched alkyl group having 1 to 4 carbon atoms, a phenyl group, or an unsubstituted amino group,
$R_4$ represents a hydrogen atom, a cyano group, an unsubstituted carbamoyl group ($-C(=O)NH_2$), a carboxylic acid ester group, or a carboxylic acid amide group,
$R_5$ represents a hydrogen atom, a linear, branched, or cyclic alkyl group having 1 to 20 carbon atoms, or $-N(-R_6)R_7$,
$R_6$ and $R_7$ satisfy the following specification (i) or (ii):
(i) $R_6$ and $R_7$ each independently represent a hydrogen atom, a linear or branched alkyl group having 1 to 8 carbon atoms, an unsubstituted aryl group, an aryl group having a substituent, an unsubstituted acyl group, or an acyl group having a substituent; and
(ii) $R_6$ and $R_7$ are bonded to each other to form a ring, and $R_6$ and $R_7$ each represent an atomic group required for forming the ring, and
X represents a carbonyl group or a sulfonyl group, and "n" represents an integer of from 1 to 3.

2. A method of producing a printed product comprising:
forming an image including a yellow image on an image receiving sheet including a coloring material receiving layer; and
forming a surface protective layer on the image,
wherein the yellow image contains a compound represented by the following formula (1) as a yellow coloring material, and
wherein in the printed product, the compound represented by formula (1) permeates to a depth of 2 μm or more from a surface of the coloring material receiving layer:

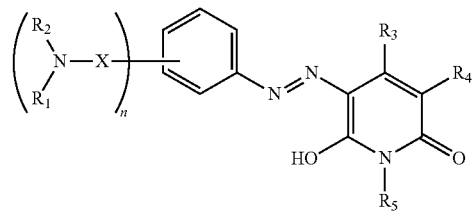

formula (1)

in formula (1),
$R_1$ and $R_2$ each independently represent a hydrogen atom, or a linear, branched, or cyclic alkyl group having 1 to 20 carbon atoms,
$R_3$ represents a linear or branched alkyl group having 1 to 4 carbon atoms, a phenyl group, or an unsubstituted amino group,
$R_4$ represents a hydrogen atom, a cyano group, an unsubstituted carbamoyl group ($-C(=O)NH_2$), a carboxylic acid ester group, or a carboxylic acid amide group,
$R_5$ represents a hydrogen atom, a linear, branched, or cyclic alkyl group having 1 to 20 carbon atoms, or $-N(-R_6)R_7$,
$R_6$ and $R_7$ satisfy the following specification (i) or (ii):
(i) $R_6$ and $R_7$ each independently represent a hydrogen atom, a linear or branched alkyl group having 1 to 8 carbon atoms, an unsubstituted aryl group, an aryl group having a substituent, an unsubstituted acyl group, or an acyl group having a substituent; and
$R_6$ and $R_7$ are bonded to each other to form a ring, and $R_6$ and $R_7$ each represent an atomic group required for forming the ring, and
X represents a carbonyl group or a sulfonyl group, and "n" represents an integer of from 1 to 3.

* * * * *